(12) United States Patent
deCarmo

(10) Patent No.: US 6,760,915 B2
(45) Date of Patent: *Jul. 6, 2004

(54) METHOD AND SYSTEM FOR SELECTING CONTENT IN A MEDIA STREAM

(76) Inventor: Linden A. deCarmo, 10467 NW. 3rd St., Plantation, FL (US) 33311

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,280

(22) Filed: Dec. 23, 1998

(65) Prior Publication Data

US 2002/0016962 A1 Feb. 7, 2002

(51) Int. Cl.[7] .......................... H04N 7/16; H04N 7/173
(52) U.S. Cl. ............................ 725/28; 725/25; 725/86; 725/87; 725/93; 386/95
(58) Field of Search ............................. 725/86, 87, 93, 725/25–31; 386/94, 95

(56) References Cited

U.S. PATENT DOCUMENTS

| | | | | |
|---|---|---|---|---|
| 5,559,548 A | * | 9/1996 | Davis et al. .................. 725/86 |
| 5,737,479 A | * | 4/1998 | Fujinami ...................... 386/95 |
| 5,778,135 A | * | 7/1998 | Ottensen et al. ............... 386/52 |
| 5,790,423 A | * | 8/1998 | Lau et al. ...................... 725/87 |
| 5,825,407 A | * | 10/1998 | Cowe et al. ................... 725/86 |
| 5,894,320 A | * | 4/1999 | Vancelete ....................... 348/7 |
| 5,911,043 A | * | 6/1999 | Duffy et al. |
| 5,956,716 A | * | 9/1999 | Kenner et al. ................. 707/10 |
| 5,973,683 A | * | 10/1999 | Cragun et al. |
| 5,995,133 A | * | 11/1999 | Kim |
| 6,005,562 A | * | 12/1999 | Shiga et al. ................. 345/327 |
| 6,031,577 A | * | 2/2000 | Ozkan et al. ............... 348/465 |
| 6,385,388 B1 | * | 5/2002 | Lewis et al. |

* cited by examiner

Primary Examiner—Andrew Faile
Assistant Examiner—Krista Bui

(57) ABSTRACT

A digital signal playback apparatus is disclosed that includes at least one digital signal input receiver, at least one digital signal output decoder, and a universal ratings manager. The universal ratings manager analyzes an incoming digital data signal to determine if the content rating for the signal is acceptable for decoding by the content rating received by the ratings manager from the user. The ratings manager is capable of analyzing multiple input signals and then outputting them simultaneously. The content rating may be based on the type of content acceptable by the user. This content includes sexual situations, language, violence, time of viewing, content author, and content source, among others.

20 Claims, 4 Drawing Sheets

METHOD AND SYSTEM FOR SELECTING CONTENT IN A MEDIA STREAM

FIELD OF THE INVENTION

This invention relates generally to a method and system for displaying selected content in a digital multimedia stream and, more particularly, to a method and system for preventing viewing of objectionable content found within one or more digital multimedia input streams.

BACKGROUND OF THE INVENTION

Consumer video display systems are transitioning from analog transport to digital multimedia streams. The digital video devices utilize high speed interfaces, such as IEEE1394 or Firewire, to receive digital media streams. As the formats are digital, it is now possible for the same device to decode multiple streams from previously incompatible formats. Along with the advent of digital video technology, content control schemes have been proposed to allow end users to limit the types of material that are available on for replay on their multimedia systems. One type of control mechanism is known as V-Chip technology. V-Chip technology enables parents or guardians to restrict the content that may be viewed on a display. V-Chip technology has been mandated by the United States government to be included in all thirteen inch or larger televisions after Jul. 1, 1999, and all televisions after Jan. 1, 2000.

The FCC has defined parental rating schemes for over the air broadcast; however, these rating systems are not applicable to recorded digital streams or local broadcast over a high speed interface. In addition, if two or more streams are decoded and displayed, each stream should have independent parental control capabilities such as when video display supports picture-in-picture viewing.

V-Chip technology permits a device to be programmed to read the signal of a given program, compare it to the level preauthorized by the viewer/parent, and then either block or allow viewing of the program. The device incorporating the V-Chip technology is programmable to allow the viewer/parent to select from the available tolerance levels in each available classification category and should a program exceed those preset levels, the program will be blocked. When a program is blocked, program information is displayed on the screen identifying program title and ratings in each of the classification categories. If a user wants to remove the blocking function, it is done by entering an assigned personal identification number (PIN).

In addition to using the rating system as a basis for television control, the V-Chip technology also allows a viewer to block the display of the television program on the basis of other parameters. These parameters include channel selection, time of day, maximum daily viewing time, and title of program. The V-Chip technology is also capable of providing a viewer with a list of program alternatives based upon preferences selected by the viewer.

U.S. Pat. No. 4,554,584, entitled "Video and Audio Blanking System," issued Nov. 19, 1985, discloses an auxilliary circuit for remote control television receiver blanking using digital code words transmitted as part of the video signal. The circuit detects and decodes the transmitted code and depending upon the code received, blanks either or both of the audio and video signals in the receiver. The television viewer has control over selecting which level of content is to be displayed. It is not apparent whether U.S. Pat. No. 4,554,584 may be modified to offer V-Chip technology.

Limitations of the V-Chip technology as well as the above-referenced patent include being unable to handle picture-in-picture situations where each picture enforces a different rating system. Further, they are not compatible with input devices that have different parental control schemes, in example, digital video disc (DVD). Moreover, neither solution provides means for enforcing parental controls on devices without built-in parental enforcement.

Accordingly, what is needed is a parental control method and system for multimedia displays that support differing technologies of parental enforcement as well as providing parental enforcement where none is available.

SUMMARY OF THE INVENTION

In accordance with the present invention, a digital signal playback apparatus is disclosed that includes at least one digital signal input receiver, at least one digital signal output decoder, and a universal ratings manager. The universal ratings manager analyzes an incoming digital data signal to determine if the content rating for the signal is acceptable for decoding by the content rating received by the ratings manager from the user. The ratings manager is capable of analyzing multiple input signals and then outputting them simultaneously. The content rating may be based on the type of content acceptable by the user. This content includes sexual situations, language, violence, time of viewing, content author, and content source, among others.

In accordance with another principle the present invention, a method for automatically screening incoming digital data input signals for content prior to output is also disclosed. The method comprises the following steps:

Step 1—identifying an acceptable content rating for any digital data input signal to be processed, Step 2—analyzing the incoming digital data input signal for a content rating, Step 3—determining whether the content rating is acceptable in view of the identified content rating, and Step 4—if content rating is acceptable, decoding the digital data input signal for output.

The step for defining an acceptable content rating is further defined by providing a user selected content rating, determining a time restriction for processing the digital data input signal, and identifying that the content rating rejects a known content author. The analyzing step further comprises identifying the author of the digital data input signal. The determining step further comprises determining if the author is banned from processing a subsequent signal decoding. The method further comprises the steps of: determining whether the content rating has been changed by the user; determining if the digital data input signal meets the changed content rating; and decoding the digital data input signal for output if that digital data input signal meets the changed content rating. The method also is capable of analyzing at least one additional incoming digital data input signal substantially simultaneously to the first incoming digital data input signal as per steps 2–4.

BRIEF DESCRIPTION OF THE DRAWINGS

The above and further advantages of the invention may be better understood by referring to the following description in conjunction with the accompanying drawings of which.

DETAILED DESCRIPTION OF THE PREFERRED EMBODIMENT

Figure 1:
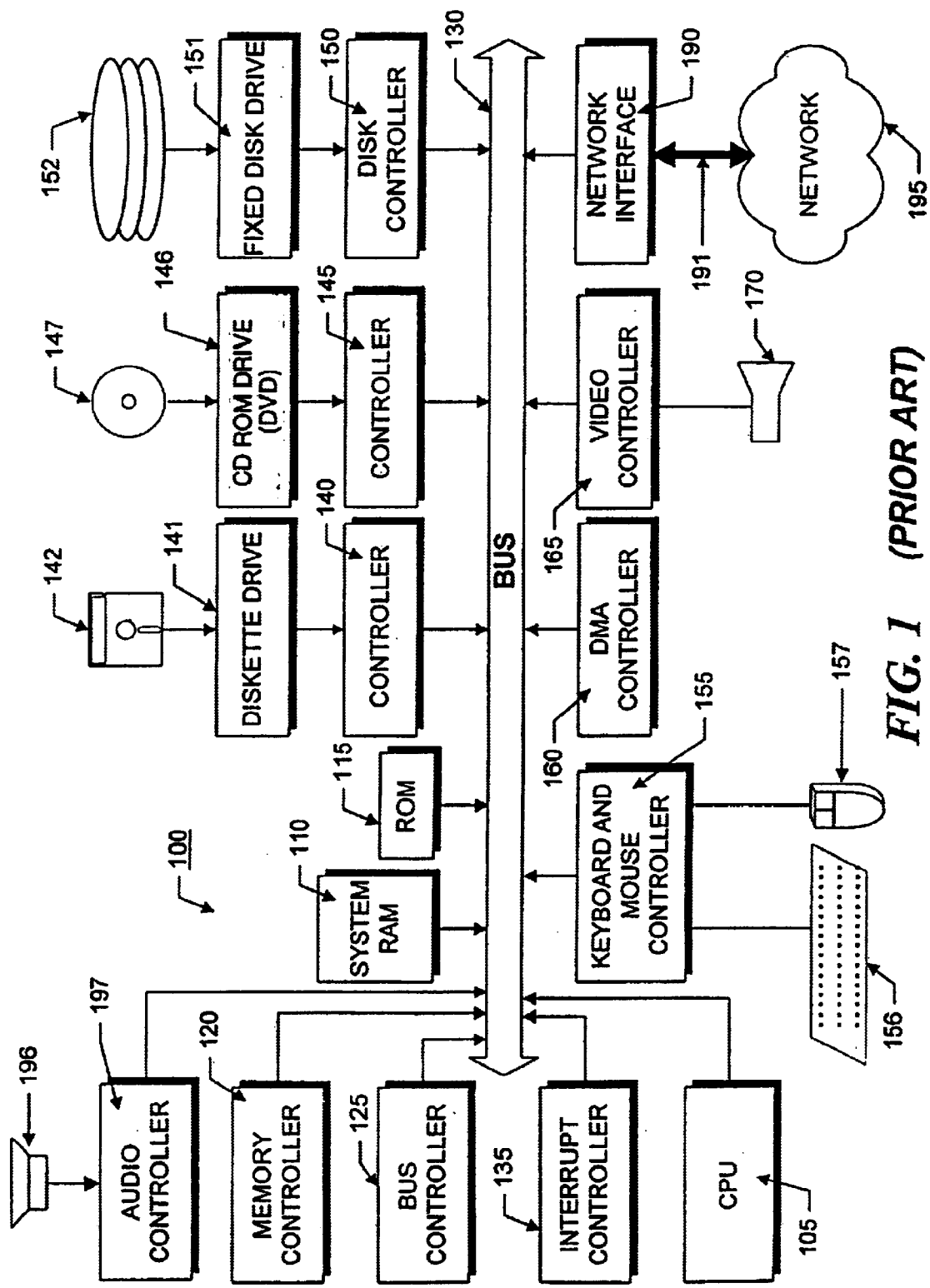
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as an IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM or DVD 147, or hard disc 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM or DVD 147 is insertable into drive 146 which is, in turn, connected to bus 130 by controller 145. Hard disc 152 is part of a fixed disc drive 151 which is connected to bus 130 by controller 150. Drive 146 may also function as a DVD drive playback unit for playing DVD content on the computer system 100.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of the computer system 100 is generally controlled and coordinated by operating system software, such as the OS/2® operating system, available from International Business Machines Corporation, Boca Raton, Fla. The operating system controls the allocation of system resources and performs tasks such as processing, scheduling, memory management, networking, and I/O services, among other things. In particular, an operating system resident in system memory and running on CPU 105 coordinates the operation of the other elements of computer system 100. The present invention may be implemented with any of a number of commercially available operating systems, including OS/2, UNIX, and DOS, etc. One or more applications such as Lotus Notes, commercially available from Lotus Development Corp., Cambridge, Mass., may execute on the computer system 100. If the operating system is a true multitasking operating system, such as OS/2, multiple applications may execute simultaneously.

Figure 2:
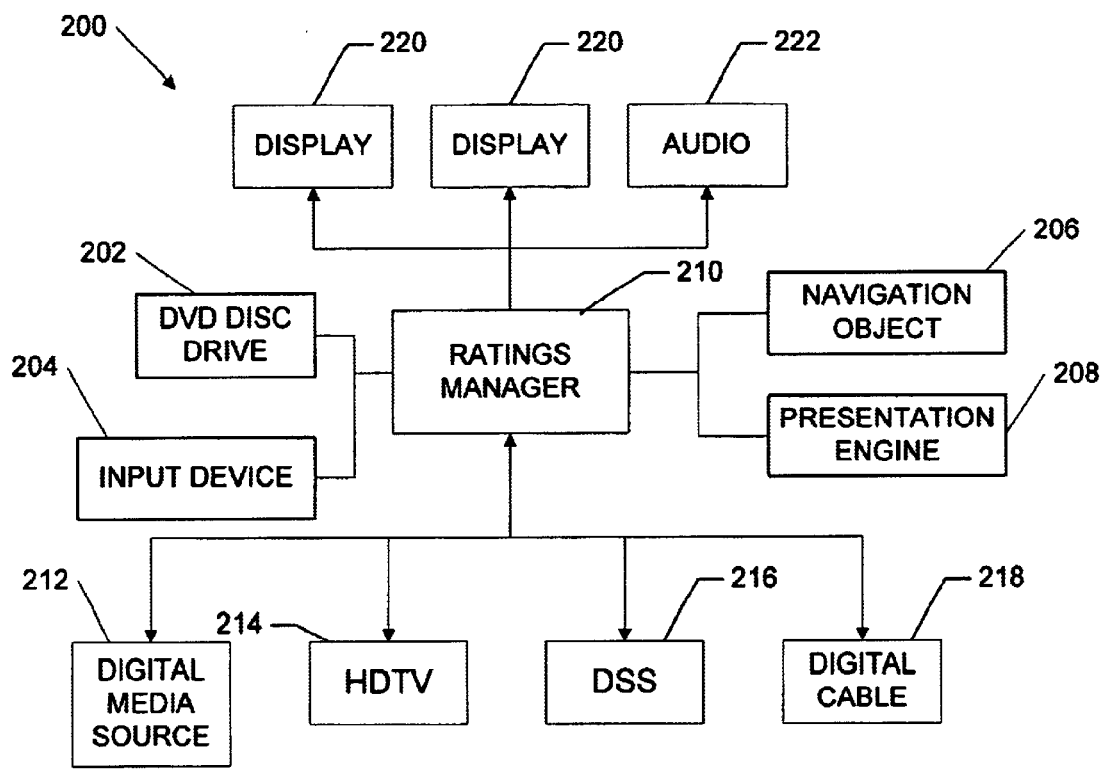
FIG. 2 is a conceptual diagram of the elements comprising a DVD system including a DVD drive and an accompanying computer with software components installed therein.

FIG. 2 illustrates conceptually the main components of a digital multimedia system 200 in accordance with the present invention. FIG. 2 shows a ratings manager 210, which connects to computer 100. A DVD drive 202 is coupled to the ratings manager 210. The use of DVD drive 202 with computer 100 should not be construed as a limitation of the invention, however, since other DVD systems, such as a DVD-VIDEO system, may be used with the ratings manager 210 in other types of multimedia devices, including television systems. Moreover, in one embodiment, the DVD drive 202 and ratings manager 210 can be integrated into the same system. In addition, the DVD drive 202 may also be a drive suitable for internal mounting in computer 100.

The DVD drive 202 receives a DVD disc containing compressed and encoded information which has been coded in accordance with the DVD 1.0 Specification for read-only discs, which preferably contain up to seventeen gigabytes of information. The computer 100 includes a driver (not shown) for enabling the operating system in the computer 100 to control and exchange information with the drive 202. It also includes one or more input devices 204 that receive input from a user.

The system 200 also includes a control and playback program shown schematically in FIG. 2 as having a navigation object 206 with logic for reading data from the drive. A presentation engine 208 includes decompressing and decoding routines for decoding the information on the disc 202 and routines for formatting the information for display. For example, the audio information may be compressed by means of conventional compression technique known as Dolby® AC-3® compression (also known as "Dolby® Digital" decompression). The video information may be compressed using a, compression technique known as MPEG-2 (Moving Picture Experts Group-2). The system 200 also includes an assortment of digital multimedia stream sources and a plurality of output devices, the digital stream sources include a digital media source 212, which may represent any type of digital signal, such as a second DVD player, a cable modem, or a other alternative digital media sources. A high definition television (HDT) source is provided as is a digital satellite system source 216. Lastly, a digital video capable source 218 may also be provided. The output devices can include, but are not limited, first and second video displays 220 as well as audio output 222. Additional video displays and audio output connections are possible and are not limited to the number illustrated in FIG. 2. Each digital input source 212–218 connects to the ratings manager 210 and in a manner that allows two-way communication between the input sources and the ratings manager 210.

Ratings manager 210 prevents unauthorized content from being viewed and controls the final output of the input streams. These final outputs go to the output devices 220 and 222.

Digital versatile discs (DVDs) are information storage devices used for storing prerecorded audio information, movies and computer software. The storage and playback mechanism used in DVDs closely resembles the mechanism used in compact discs (CDs) and DVD players and software use the same laser technology as CD players. Briefly, both DVDs and CDs store information as a pattern of pits formed in a metallic substrate. The pit patterns form digital words and the digital words are read by shining a laser beam on the disc surface and detecting the reflected beam. However, the information storage capacity of a typical DVD is much higher than a CD. Presently available DVDs have a variety of capacities that depend on the technology used to manufacture the discs. Single-layer technologies can be either single or double-sided with capacities of 4.7 gigabytes and 9.4 gigabytes, respectively. Dual layer technologies are available which use single or double-sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs that are used to store video information (hereinafter called DVD-VIDEO discs) may use various known information compression algorithms, such as MPEG-2 for video compression/decompression. A DVD may also include high fidelity sound as well. In addition, a DVD may also store uncompressed linear Pulse Code Modulated data streams, which have sample rates between 48–96 kHertz and are sampled at 16 or 24 bits. Still other DVD versions (hereinafter called DVD-ROM discs) can store digital data for computer use, and the data may also be compressed on these discs.

Each DVD-VIDEO disc contains a main directory denoted as a VIDEO_TS directory, which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects (or particular scenes) within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode. Program chains allow a particular program sequence to be changed during playback. Thus, it is possible to change the program content based on stored information. This type of operation is used in implementing "parental control" levels in which information content that parents might find inappropriate (such as extremely violent or sexual material) can be removed during playback and other material substituted without requiring several separate and complete programs.

In an illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor that uses the corresponding class definition and additional information, such as arguments provided during object creation, to construct the object. Likewise, objects are destroyed by a special function called a destructor. Objects may be used by using their data, attributes, or invoking their functions, or methods. When an object is created at runtime, memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which accesses the object's private data. The public functions form a controlled and consistent interface between the private data and the "outside" world. Any attempt to write program code which directly accesses the private variables causes the compiler to generate an error during program compilation. The error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 3:
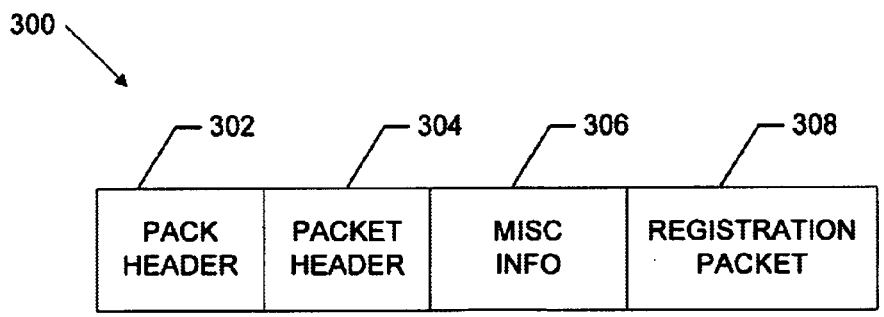
FIG. 3 is a block diagram illustrating the data flow that includes a registration packet according to the present invention.

In accordance with the principles of the present invention, player system 200 includes ratings manager 210. Ratings manager 210 is used to authenticate a given stream from any of the input streams 212–218. With reference to FIG. 3, a broadcast transmission packet 300 is shown comprising a pack header 302, a packet header 304, miscellaneous information 306, and registration packet 308. In the illustrative embodiment, pack header 302 may be implemented with fourteen bytes of digital information. Packet header 304 may be implemented with either nine or fourteen bytes of digital information while the miscellaneous information 306 may be implemented with as little as a single byte. The information stored in registration packet 308 includes the parental control configuration for the particular input source as well as the controls for the particular output sources.

Figures 4, 5:
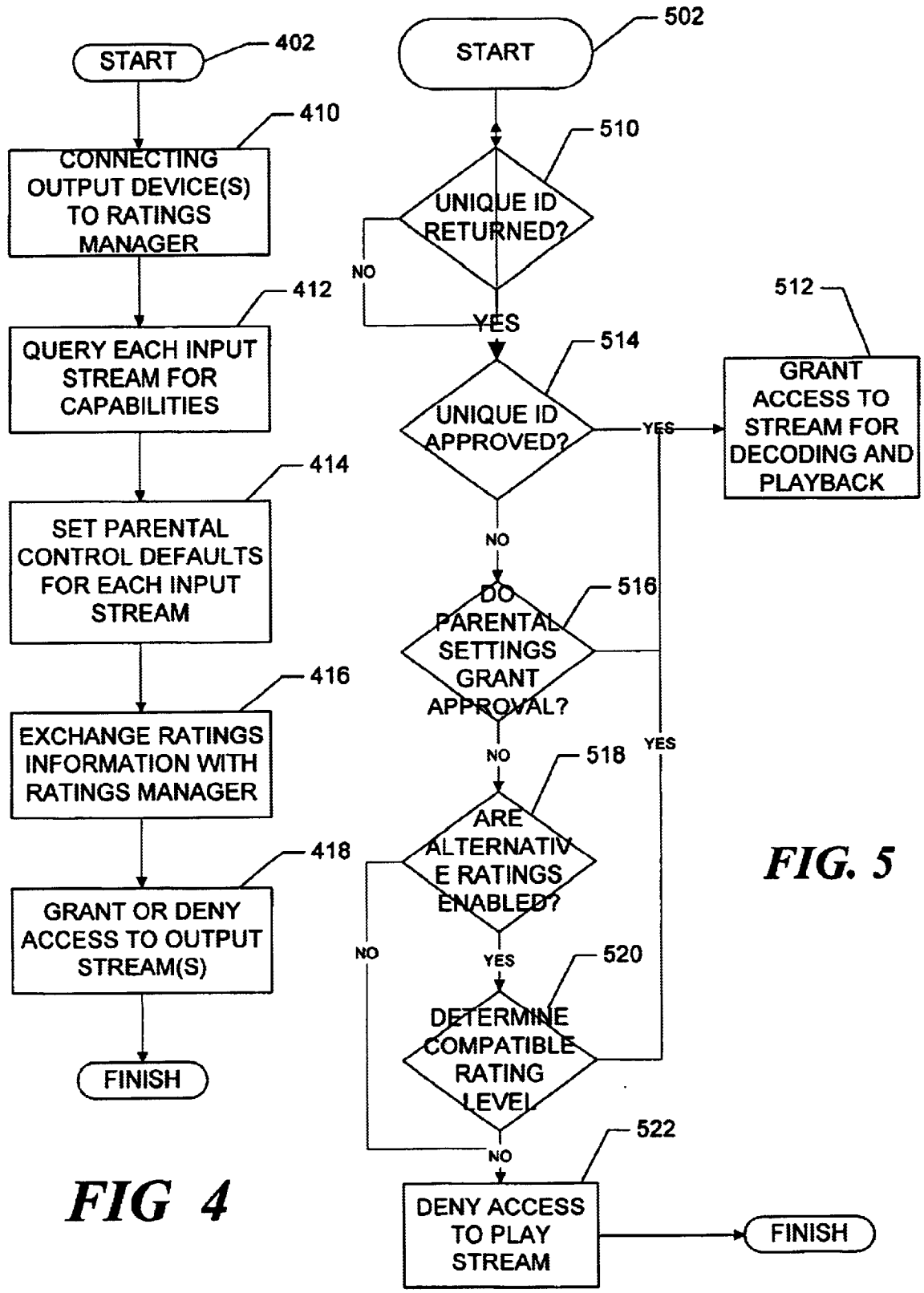
FIG. 4 is a flow chart illustrating the method for performing viewing authentication of an input stream according to the principles of the present invention.
FIG. 5 is a flow chart illustrating the method steps for granting decoding access to the incoming data stream according to principles of the present invention.

In accordance with the principles of the present invention, player system 200 proceeds to perform viewing authentication of a input stream according to the steps illustrated in the flow diagram of FIG. 4. Beginning in step 402, the system proceeds to step 410 where each input device is attached to ratings manager 210. Next, in step 412, ratings manager 210 queries the capabilities of each and every input stream connected thereto. In step 414, the ratings manager 210 sets the parental control defaults for all input streams based upon the capabilities queried in step 412. Next, in step 416, each input stream exchanges its ratings information with the ratings manager and then proceeds to step 418. In step 418, ratings manager 210 either grants or denies access for each input stream to the connected output streams. Information exchange between ratings manager 210 and the various input streams 212–218 occur by placing the desired information in registration packet 308. During the querying of each input stream of step 412, rating manager 210 attains the following capabilities. The first capability is whether the input stream provides UniqueIDSupport, which indicates if the stream has associated a unique ID and if the stream may only be authenticated by the unique ID. For example, VideoCD has no rating system so it must be authenticated via the unique ID. The next capability includes Parental-Control capabilities. ParentalControl indicates if the stream contains parental control features. The last capability includes any device specific parental control capabilities, such as, for example DVD or VCD classes. If the stream contains multiple parental control levels, ratings manager informs the input stream about the preferred parental controls. For example, if a DVD disc contains "PG-13" and "G" versions of the content and the DVD player was configured to enable PG-13 playback, it would send the PG-13 version. If ratings manager 210 had been configured for "G" content, ratings manager 210 would request that the G version be played instead of the PG-13 version.

Each input video stream must register with the ratings manager before they are decoded within the DVD player 210. Most of the information is stored in a 32-bit field where zero indicates no objectionable material and 0xFFFFFF indicates the highest concentration of potentially objectionable material. The registration process communicates the following information to the writings manager 210:

Violence level of the content
Sexual level of the content
Adult language of the content
Country specific rating of content
Rating country of origin (ISO 3166 code)
Unique identifier
Unique identifier name (typically the stream name or movie title)
UniqueID only
Output stream usage. Input stream indicates which output device it will use.
Display time (used by time-based controls)
Stream channel number (for broadcast video, this is the TV channel)
Production crew [ ] an array of all companies and individuals involved with the content To grant access to the data stream for decoding and playback, the ratings manager 210 performs a series of checks against its own database as well as the ratings systems involved in either the data source or the data destination locations. FIG. 5 is a flow chart illustrative of the method steps in granting decoding access to the incoming data stream. Beginning in step 502, the system proceeds to step 510 where ratings manager 210 continues to check for each input stream returning its uniqueID. As the uniqueID is returned, and as depicted in step 514, ratings manager 210 checks a database stored within a volatile memory section of the ratings manager 210 to determine if the unique identifier is approved for viewing. If approval is granted, then the stream is decoded and played on the known output devices as per step 512. If the uniqueID is not approved, then it proceeds to the next step 516.

In step 516, ratings manager 210 compares the parental settings currently in effect against the ratings of the uniqueID to determine whether there is correspondence. If there is correspondence, then approval is granted in step 512 so that the stream may be decoded and played on the known output devices. If the approval is denied, the ratings manager proceeds to step 518.

In step 518, the rating manager 210 carries the input stream to determine if it supports alternative versions with different ratings. For example, the DVD disc may have multiple rating levels that have been implemented by the user. If the multiple ratings are enabled, the ratings manager attempts to find a compatible rating level in step 520. If the alternative ratings have not been enabled, or the compatible rating levels do not grant access for decoding the video stream, the system proceeds to step 522. In step 522, ratings manager 212 denies access to play the video stream and returns a signal identifying the reasons why access has been denied on the output source. If a compatible level is found, the system then proceeds to step 512 to grant access to the stream for decoding and playback.

Figure 6:
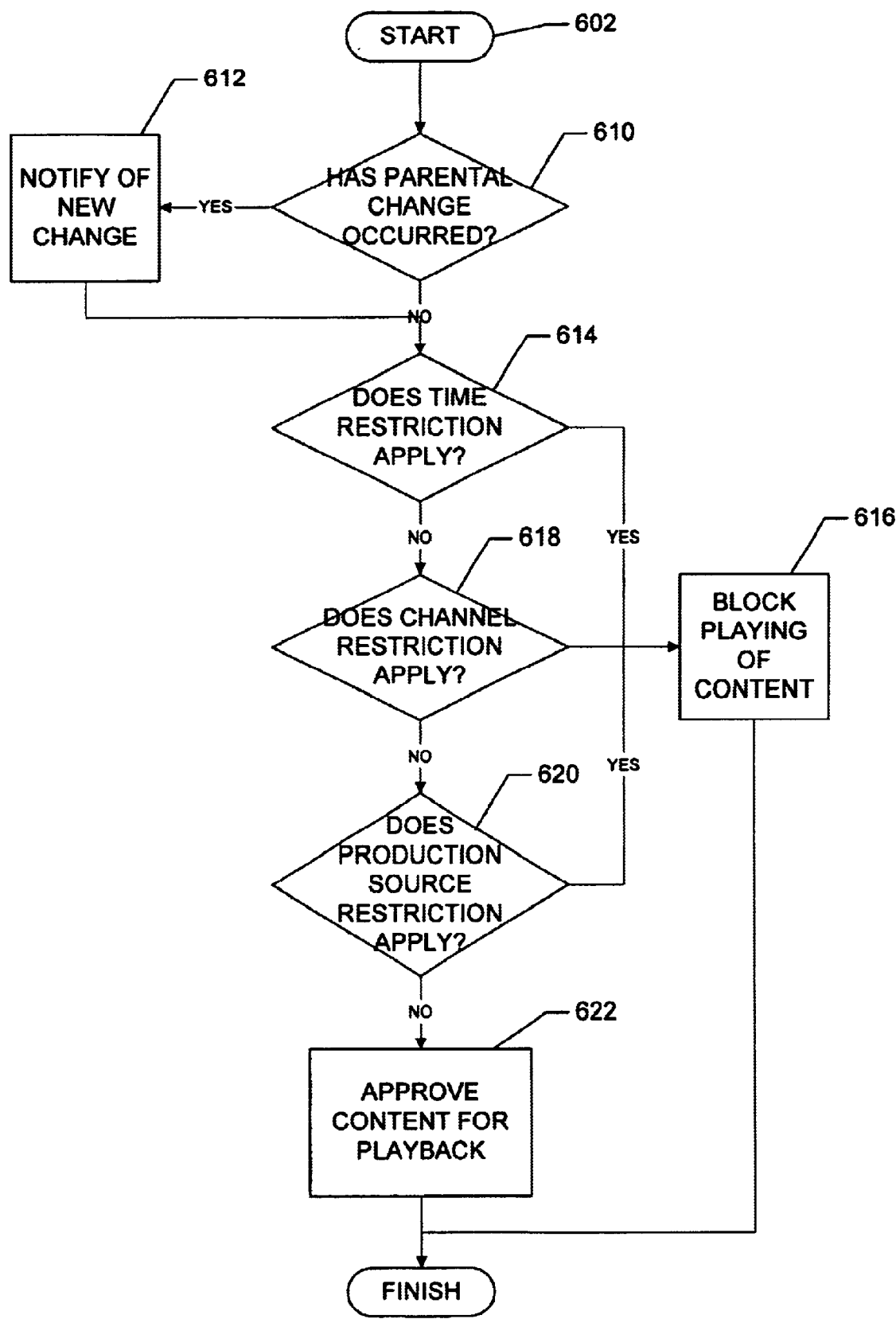
FIG. 6 is a flow chart illustrating the method of performing additional control checks in accordance with the present invention.

Ratings manager 210 performs additional control checks as illustrated in the flow chart of FIG. 6 which is an illustrative representation of the method in accordance with the present invention. One element that is not provided for in any of the prior solutions is the ability to change the control level at any given time and have it effected on the decoding of the input data stream. Thus, starting in step 602, the ratings manager proceeds to step 610 to determine whether a parental control level change has occurred. If a parental control level change has occurred, the system proceeds to step 612 to notify the output device performing the decoding of the data stream of the new change and to decode the appropriate content based on the new code rating. If the parental change has not occurred and once the new change has been performed, the system proceeds to step 614. The ratings manager 210 evaluates whether a time restriction applies as to whether the stream is allowed to be decoded at that particular time noted (step 614). If no restriction applies, then the system proceeds to block 618; otherwise, the system proceeds to step 616. In step 616, the ratings manager 210 allows or blocks the plane of the content. In block step 618, the ratings manager 210 determines whether a channel restriction applies to the particular data stream. Channel restrictions refer to the source channel of the incoming data stream. If a restriction does apply, the system proceeds to step 616. If no restriction applies, the system proceeds to step 620. In step 620, ratings manager 210 determines whether the actual production source of the multimedia content is on a restriction list. This restriction can apply to the producer, the production, company, the director, as well as the actors or other indicia that the end user determines should be restricted. If a restriction does apply, the system proceeds to step 616. If no restriction applies, the system proceeds to step 622 where approval is granted for the playing back of the content and its decoding for viewing on the video displays and the audio source.

An assortment of pseudo-code descriptors is provided that describe the various operations of ratings manager 210. They are provided as an example of a given embodiment of the present invention. It is apparent to those skilled in the art that modifications may be made to any of these pseudo-code representations to determine the ratings control level if acceptable by the user in decoding digital data streams. It is also apparent that this method and system applies to multiple data streams, each data stream being uniquely evaluated for access and decoding. The individual review of each data stream allows for multiple sources having multiple control settings to be viewed on the output devices.

m_pInputStream: pointer to the input stream m_registrationvalues: structure for registration values m_reasonforfailure: contains specific error code why content is not playable typedef struct

```
        {
                ViolenceLevel
                SexualLevel
                LanguageLevel
                CountryRating
                RatingCountry
                UniqueID
                UniqueIDName
                OutputDevicesUsed
        }REG_VALUES;
```

AuthenticateNewStream( )
  purpose: authorize and display an input stream. Obtain capabilities of input stream via m_pInputStream->ReportCapabilities( )
  Check if input stream device is prohibited from decoding at the current time
  If device isn't currently usable, set m_display to FALSE
  Tell input stream about preferred Parental control setting M_pInputStream->SetRatingsPreferences( )
  Get the unique ID associated with the stream m_pInputStream->GetUniqueIDInfo( )
  Check if the ProductionCrew associated with the content is permissible
  If the ProductionCrew is not acceptable, set m_display to FALSE
  If device not prohibited from playing AND
  stream not authenticated AND
  Stream contains parental ratings AND
  no one from the ProductionCrew [ ] is on the prohibited list
    while stream not authenticated
      ValidateRatings( ) for the stream
      If stream not authenticated
        If stream enables multiple ratings
          Get the next rating m_pinputStream->ReportAlternativeLevels( )
        if there are no more levels
          exit while loop
        else
          exit while loop
      else
        set m_display member variable of m_pInputStream object to TRUE
        exit while loop
  if m_display member variable of m_pInputStream is TRUE
    Decode Input Stream DecodeStream (m_pInputStream)
ValidateRatings( )
  purpose: returns stream authorization information using the active ratings settings.
  Obtain parental ratings of input stream via m_pInputStream->RegisterWithManager( )
  And store in m_registrationvalues
  if CheckRatingsDatabase( ) authorizes this stream
    report that this stream is playable
CheckRatingsDatabase( )
  purpose: determines if a given stream is capable of being viewed.
    if input stream contains ratings
      Compare parental control values associated with the stream with the maximum acceptable values requested by the user.
      If content is acceptable, report that stream is approved
      else, report that stream is not approved
    else
      find matching unique id associated with the stream
      unique id found?
      Yes.
      No. Call GetUniqueIdInfo( )
        Report answer from GetUniqueIdInfo( )
ListenforParentalChanges( )
  purpose: monitors dynamic changes in objectionable material settings
  If input stream (m_pInputStream) rating change occurs Call AuthenticateNewStream( ) with the new ratings.
EnsureStreamStillValid(m_pInputStream)
purpose: enforce time-based restrictions on a given stream
  compare current movie time to restricted viewing times
Is current time prohibited from displaying content?
  return FALSE (content not playable)
Is current channel prohibited from displaying content at current time?
  return FALSE (content not playable)
return TRUE(content playable)
DecodeStream(m_pInputStream)
purpose: decode stream and send to output devices route output to the appropriate decoder
while TRUE
  Ensure still stream display is still valid (EnsureStreamStillValid( ))
  If display is not valid, exit loop and display error output stream
  Listen for modifications to objectionable materials in the stream (via ListenforParentalChanges( ))
GetUniqueIDInfo( )
purpose: examine unique id database to see if content is acceptable
Ask the user if the content associated with the unique id can be played.
Store answer in a database of unique ids.
If user enables stream playback, report that stream must be authorized.
Else, report that stream has not been authorized.
The following pseudo-code describes the operation of an input stream:
RegisterWithManager( )
purpose: reports stream rating level information to the manager
Does input stream contain rating levels?
  Yes.
    Input stream must map its internal rating level to the vendor neutral system describe in this disclosure. The following fields must be set:
    ViolenceLevel
    Sexual Level
    Language Level
    CountryRating
    RatingCountry
    UniqueID (not applicable)
    UniqueIDName (not applicable)
    OutputDevicesUsed: report the number of output devices used by the stream. return rating level data structure
  No.
    Obtain unique identifier.
    ViolenceLevel (not applicable)
    SexualLevel (not applicable)
    LanguageLevel (not applicable)
    CountryRating (not applicable)
    RatingCountry (not applicable)
    UniqueID: place stream unique identifier here
    UniqueIDName: attach a unique name (if it exists) here
    OutputDevicesUsed: report the number of output devices used by the stream.
    Return rating level data structure
ReportCapabilities( )
purpose: return stream capabilities to the manager
report if stream contains a rating level (or multiple levels if applicable)
report if stream support unique identifiers
report the output devices (i.e. audio and video) that the stream requires.
SetRatingsPreferences(preference)
purpose: informs input stream of preferred parental control level
if stream enables multiple ratings and if the parental control level requested by the caller exists in the stream
  Set internal active rating level to the level requested by the caller
ReportAlternativeLevels(alternative option)
purpose: reports stream rating level information to the manager for an alternate rating level
if stream enables multiple ratings
  Set internal active rating level to the alternative option
  Call RegisterWithManager( ) with the new alternate rating level and report answer to the ratings manager.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 either can be a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be reliably substituted. Further, the methods of the invention may be achieved in either all software implementations, using the appropriate processor instructions, or in hybrid implementations which utilize a combination of hardware logic and software logic to achieve the same results. Hardware implementations may include a microprocessor in combination with various support circuitry, a single-chip microcontroller, hybrid circuits which employ packaging techniques other than plastic- or ceramic-encapsulated packaging, or application specific integrated circuits (ASICs). The ASICs may take the form of gate arrays, structured cell arrays, or full custom integrated circuits, for example. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. A digital signal playback apparatus comprising:
at least one digital signal input receiver that couples to an outside digital data signal source to receive a digital data signal;
at least one digital signal output decoder that decodes and outputs the digital data signal; and
a universal ratings manager, coupled to the at least one digital signal input receiver and the at least one digital signal output decoder, the universal ratings manager for:
(A) receiving a signal indicating an acceptable content rating currently selected by a user,
(B) querying any outside digital data signal source to determine if a unigue identifier is associated therewith in-place of a content rating,
(C) analyzing packetized data within the digital data signal for a unique identifier of a source of a stream of unrated digital data signal and a content rating, and
(D) distributing the digital data signal to the at least one digital signal output decoder for decoding the digital data signal consistent with the unique identifier of the source of the stream of unrated digital data signal and a content rating currently selected by a user.

2. The apparatus of claim 1 wherein the ratings manager is capable of automatically determining the content rating.

3. The apparatus of claim 1 wherein the ratings manager responds to a new content rating selected by the user and evaluates whether the digital data signal is approved for continued decoding.

4. The apparatus of claim 1 wherein the ratings manager permits signal decoding only during user-selected time settings.

5. The apparatus of claim 1 wherein the ratings manager reviews a second input digital data stream and forwards it to a second output source for decoding simultaneously with the first digital data stream.

6. The apparatus of claim 1 wherein the content rating is based on the content source.

7. The apparatus of claim 1 wherein the content rating is determined by a parental viewing title selected from a ratings system comprising G, PG, PG13, R, NC17, and NR ratings.

8. A method for automatically screening an incoming digital data input signal from an outside digital data signal source for content prior to output to at least one digital signal output decoder, comprising the steps of:
(a) identifying an acceptable content rating for any digital data input signal to be processed;
(b) providing a universal ratings manager, coupled to at least one digital signal input receiver and the at least one digital signal output decoder and at least one previously stored unique identifier of a source of a stream of an unrated digital data signal;
(c) analyzing with a universal ratings manager, a packet within the incoming digital data input signal for a unique identifier of a source of a stream of unrated digital data input signal and a content rating;
(d) if a content rating is present, determining whether the content rating is acceptable in view of the content rating;
(e) if no content rating is present, determining if the previously stored unique identifier of a source of a stream of unrated digital data input signal is present within the packet; and
(f) if the one of the content rating and unique identifier of the source of the stream of unrated digital data input signal is president and acceptable, distributing the digital data signal to the at least one digital output decoder for decoding.

9. The method of claim 8 wherein step a comprises:
(a1) providing a user selected content rating.

10. The method of claim 8 wherein step a comprises:
(a2) determining a time restriction for processing the digital data input signal.

11. The method of claim 8 wherein step a comprises:
(a3) identifying if the content rating rejects a known content author.

12. The method of claim 11 wherein step b comprises:
(c1) identifying the author of the digital data input signal.

13. The method of claim 12 wherein step c comprises:
(d1) determining if the author is banned from processing.

14. The method of claim 8 further comprising the steps of:
(g) determining whether the content rating has been changed by the user;
(h) determining if the digital data input signal meets the changed content rating;
(i) decoding the digital data input signal for output if the digital data input signal meets the changed content rating.

15. The method of claim 8 further comprising the step of:
(g) analyzing a second incoming digital data input signal substantially simultaneously to the incoming digital data input signal utilizing steps (c)–(f).

16. A computer program product having computer readable program code stored on a computer useable medium to automatically screen an incoming digital data input signal from an outside digital data signal source for content prior to output to at least one digital signal output decoder, the computer program product on the medium comprising:
program code to identify an acceptable content rating for any digital data input signal to be processed;
universal ratings manager program code, counted to at least one digital signal input receiver and the at least one digital signal output decoder and at least one previously stored unique identifier of a source of a stream of an unrated digital data signal;
program code to analyze a packet within the incoming digital data input signal for a unique identifier of a source of a stream of unrated digital data input signal and a content rating;
program code to determine whether the content rating is acceptable in view of the identified content rating, if a content rating is present;
program code to determine if a previously stored unique identifier of a source of a stream of unrated digital data input signal is present within the packet and acceptable, if no content rating is present; and
program code to distribute the incoming digital data input signal to the at least one digital output decoder, if one of the content rating and unique identifier of the source of the stream of unrated digital data input signal is present within the packet and acceptable.

17. The computer program product of claim 16 further comprising program code to provide a user selected content rating.

18. The computer program product of claim 16 further comprising program code to determine a time restriction for processing the digital data input signal.

19. The computer program product of claim 16 further comprising:

program code to determine whether the content rating has been changed by the user;

program code to determine if the digital data input signal meets the changed content rating;

program code to decode the digital data input signal for output if the digital data input signal meets the changed content rating.

20. The computer program product of claim 16 further comprising program code to analyze a second incoming digital data input signal substantially simultaneously to the incoming digital data input signal and output the second incoming digital data input signal for decoding if the second incoming digital data input signal has an acceptable content rating.

\* \* \* \* \*